US011882236B2

(12) United States Patent
Singh et al.

(10) Patent No.: US 11,882,236 B2
(45) Date of Patent: Jan. 23, 2024

(54) SYSTEM AND METHOD FOR DETECTING FRAUD IN INTERNATIONAL TELECOMMUNICATION TRAFFIC

(71) Applicant: BICS SA/NV, Brussels (BE)

(72) Inventors: Abhijeet Singh, Evere (BE); Katia Gonzalez Gutierrez, Auderghem (BE)

(73) Assignee: BICS SA/NV, Brussels (BE)

( * ) Notice: Subject to any disclaimer, the term of this patent is extended or adjusted under 35 U.S.C. 154(b) by 299 days.

(21) Appl. No.: 17/594,239

(22) PCT Filed: Apr. 9, 2020

(86) PCT No.: PCT/EP2020/060297
§ 371 (c)(1),
(2) Date: Oct. 7, 2021

(87) PCT Pub. No.: WO2020/212275
PCT Pub. Date: Oct. 22, 2020

(65) Prior Publication Data
US 2022/0182486 A1 Jun. 9, 2022

(30) Foreign Application Priority Data
Apr. 16, 2019 (EP) .................................. 19169519

(51) Int. Cl.
*H04M 3/22* (2006.01)
*H04M 15/00* (2006.01)

(52) U.S. Cl.
CPC ......... *H04M 3/2281* (2013.01); *H04M 15/47* (2013.01); *H04M 15/49* (2013.01); *H04M 15/00* (2013.01)

(58) Field of Classification Search
None
See application file for complete search history.

(56) References Cited

U.S. PATENT DOCUMENTS

| 5,627,886 A | 5/1997 | Bowman |
| 6,721,405 B1 * | 4/2004 | Nolting ............... H04M 3/2281 |
| | | 379/112.01 |

(Continued)

FOREIGN PATENT DOCUMENTS

| EP | 2671372 B1 | 4/2015 |
| EP | 3324607 A1 | 5/2018 |

(Continued)

OTHER PUBLICATIONS

International Search Report with Written Opinion from PCT Application No. PCT/EP2020/060297, dated Jul. 15, 2020.

(Continued)

*Primary Examiner* — Quoc D Tran
(74) *Attorney, Agent, or Firm* — Workman Nydegger

(57) ABSTRACT

A system for detecting fraud in international telecommunication traffic, includes: a transactions registry accessible by multiple operators and/or carriers; a logging module installed with multiple operators and/or carriers configured to add an entry in the transactions registry by an operator and/or carrier handling a call, wherein an entry comprises the calling number, the called number and timing information for the call; a fraud detection and classification module configured to: select from the transactions registry a group of correlated entries representing the call; compare the correlated entries to detect an anomaly due to fraud and to classify the call into a fraud type.

21 Claims, 18 Drawing Sheets

(56) References Cited

U.S. PATENT DOCUMENTS

| | | | | |
|---|---|---|---|---|
| 6,891,938 | B1 * | 5/2005 | Scott | H04M 15/00 |
| | | | | 379/112.01 |
| 7,379,536 | B2 * | 5/2008 | McDonald | H04M 3/545 |
| | | | | 379/32.01 |
| 8,966,074 | B1 * | 2/2015 | Richards | H04M 15/8214 |
| | | | | 709/224 |
| 10,582,043 | B1 * | 3/2020 | Eichhorn | H04M 1/575 |
| 11,025,782 | B2 * | 6/2021 | Boussac | H04W 4/24 |
| 2009/0069047 | A1 | 3/2009 | Russell et al. | |
| 2010/0087191 | A1 | 4/2010 | Kocsis | |
| 2011/0033032 | A1 | 2/2011 | Zhang et al. | |

FOREIGN PATENT DOCUMENTS

| | | | | |
|---|---|---|---|---|
| WO | WO-2011080638 A1 * | 7/2011 | | H04M 3/2281 |
| WO | 2018056925 A2 | 3/2018 | | |

OTHER PUBLICATIONS

Extended Search Report from corresponding EP Application No. 19169519.6, dated Sep. 26, 2019.

International Preliminary Report on Patentability from PCT Application No. PCT/EP2020/060297, dated Mar. 12, 2021.

Laryea et al., "Effect of SIM-boxing on QoS and QoE," International Telecommunication Union, The Gambia, Ghana, Guinea, Uganda, Zambia, Zimbabwe, Sep. 19-28, 2017, pp. 1-15.

Ying, "The Function Sets of Telecom Anti-fraud Management in the M.rtafm document (Section 9)", International Telecommunication Union, China Telecom, Dec. 19-20, 2018, pp. 1-13.

"2018 TM Forum Blockchain Unleashed," Blockchain Unleashed, https://www.tmforum.org/wp-content/uploads/2018/03/T.-Blockchain-Unleashed.pdf [Accessed Oct. 1, 2021], Dec. 26, 2018, pp. 1-25.

Orange: "Shared Ledger for NFV Fault Management", ETSI, Feb. 12, 2019, pp. 1-11.

* cited by examiner

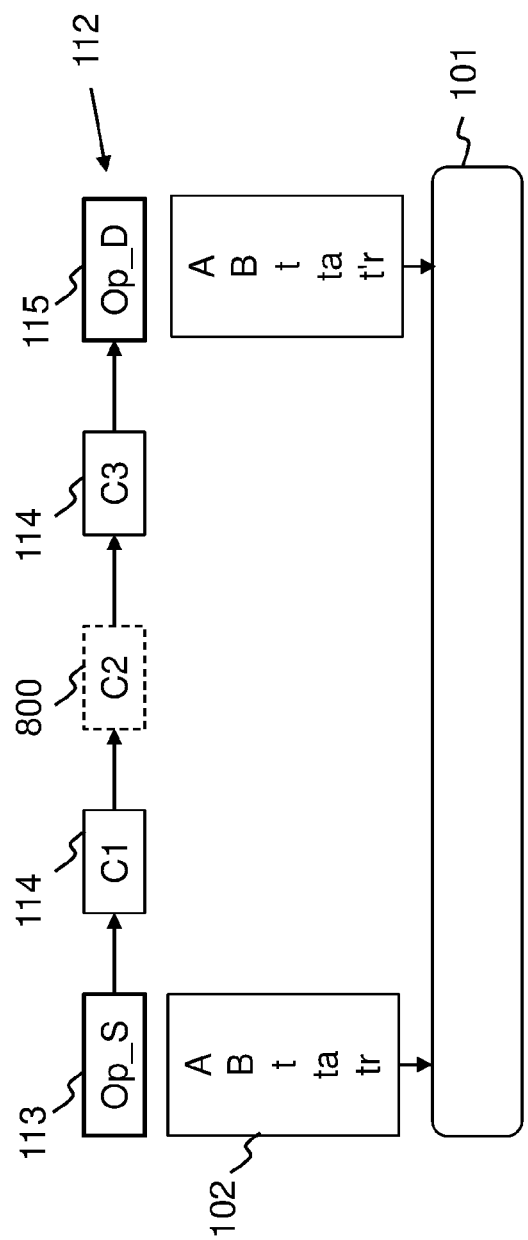

SYSTEM AND METHOD FOR DETECTING FRAUD IN INTERNATIONAL TELECOMMUNICATION TRAFFIC

FIELD OF THE INVENTION

The present invention generally relates to the field of international telecommunications. In particular, it relates to the field of detecting fraud in international telecommunication traffic, where this fraud is due to a lack of end-to-end visibility in the international call chain.

BACKGROUND OF THE INVENTION

International telecommunications traffic uses operator networks in different countries to transfer calls or other types of communication. Typically, telecom operators rely upon a wholesale carrier to manage their international traffic. Wholesale carriers offer their clients international routes to a multitude of destination operators. In practice, various routes are available to reach a specific destination operator. E.g., a direct interconnect with the destination operator network may be established, or various in-between carriers may be involved in transporting the call to the destination operator. The actual choice to route a call to one or another carrier or operator is largely cost-driven, taking into account the rates agreed upon in interconnect agreements. Also quality parameters, measured for different routes, may be taken into account. In practice, routing is a dynamic process, as the rates in interconnect agreements are frequently renegotiated. Moreover, due to business secrets, no transparency is offered concerning actual ratings agreed between two parties. This closedness is also reflected in the operational level: in the technical setup of a call, visibility is limited to traffic exchange between neighbouring parties only. This lack of transparency between source and destination operators and carriers in between is exploited by fraudulent operators and carriers, and gives rise to various types of fraud in international telecom traffic.

A first type of fraud is often referred to as call hijacking. In this type of fraud, international calls routed via a fraudulent carrier are terminated e.g. using an Interactive Voice Response (IVR) or a recorded message, instead of being transferred further towards a next carrier or the targeted destination operator. As a result, the fraudulent carrier can charge the source operator for carrying out the international call, without having costs for delivering the call to the next carrier or destination operator. In practice, those fraudulent parties frequently offer low rates, thereby attracting more traffic being routed to them. Calls being hijacked may be part of the regular customer traffic, or may be artificially generated by the fraudulent party, e.g. by generating calls to unallocated, closed or non-existing numbers in the destination network. Moreover, call hijacking may be combined with fraud taking place at the source. E.g. by hacking a PBX phone system, fraudsters establish a call-forwarding or install program software which initiates calls automatically with a route passing the fraudulent carrier. Any subscriber in the destination country never receives these calls, while the source operator or the subscriber in originator country is expected to pay for the traffic.

In another type of fraud, often referred to as Simbox fraud or interconnect bypass fraud, the international interconnection facility to the destination operator is bypassed by sending the call to a SIM box, i.e. a machine that houses local SIM cards of the destination operator, preferably with low local tariff. Next, a local call is initiated from the SIM box, which is terminated by the destination operator. As the international call effectively reaches its destination, a wholesale carrier managing the international call may not notice anything fraudulent. Bypassing the international interconnect means that the destination operator ends up receiving an international call over a local call. Therefore, the destination operator misses out on international interconnection revenues, which are normally much higher than local retail rates applying for intra-operator calls within the country or local interconnection revenues applying for inter-operator calls within the country.

A loss for the destination operator also occurs in fraud types referred to as CLI manipulation and refiling. In CLI manipulation, the Caller Line Identification (CLI) or calling number is manipulated to generate a fake origin of the call, for which lower origin-based termination rates apply. In refiling fraud, a specific agreement between two parties, e.g. a first party in country X and a second party in country Y, is misused. Such a specific agreement may agree upon low termination rates or lower cost for traffic from agreed origins, e.g. originating from country X and ended in country Y. Next, the operator in country X, being fraudulent, attracts more traffic by offering special rates lower than international interconnect rates to country Y, to other operators or carriers. Therefore, a lot of international traffic to country Y is routed in such a way that the specific ending route country X—country Y is included, for which lower origin-based termination rates apply.

In yet another fraud type the call is manipulated to increase income for the fraudulent in-between operator, e.g. by falsely 'stretching' the call. Billing starts at the time a call is answered and ends when that call is released. When a party in the traffic flow chain returns a false answer signal to the carriers earlier in the chain, e.g. by first playing a recorded media like an announcement or sound of a ringing tone before the call is actually answered, billing for all parties is initiated earlier than the actual start of the conversation. In another variant, the call is artificially stretched by e.g. repeating the recorded conversation or playing an announcement after the real conversation has ended. The caller listens to the recorded message, thereby delaying the release time, and often will call again.

Fraud in international telecommunication traffic due to the lack of end-to-end visibility brings substantial losses for operators and carriers. In order to fight it efficiently, there is an overall need for systems allowing to detect such international telecommunications fraud and to identify fraudulent parties being responsible for it.

Various systems have been described in the literature attempting to provide systems for fraud detection in international telecommunications traffic. A first group of solutions relies on test calls. A test call platform comprising probes in networks of multiple telecommunications operators schedules and executes test calls between these probes and analyses the received CLI to detect interconnect bypass fraud. Such a solution is e.g. found in EP2671372B1. This solution focusses on the detection of one type of fraud, namely Simbox or interconnect bypass fraud. Moreover, detection relies on test calls specifically performed for the purpose of fraud detection, involving a substantial cost. Finally, call characteristics being specific for test calls may be easily identified by fraudulent parties, leading to antidetection.

A second group of solutions for detecting international telecom fraud relies on profiling, which means that Call Detail Records (CDR) of a telecom operator are analysed in order to detect suspicious behaviour being typical for a specific type of fraud. For example, in EP3324607A1 CDRs are collected for a given time period, and these collected data are used to build a decision model with machine learning techniques. Afterwards, the decision model is used to determine a likelihood that a particular call is fraudulent. In "The function sets of telecom anti-fraud management in the M.rtafm document (Section 9)'; ITU-T DRAFT; study period 2017-2020; study group 2; series C3; International Telecommunication Union, Geneva, CH, vol. 5/2, 18 Dec. 2018, pages 1-13, XP044257227", a general solution for a fraud management system is described, based on analysing CDRs. In U.S. Pat. No. 5,627,886 usage patterns indicative of fraud are analysed, using event records like CDRs, to build simple rules to detect fraud. As CDR data is private information that is not shared amongst multiple operators, profiling is limited to the context and knowledge of a single operator. Moreover, profiling results may have limited reliability as they only give a likelihood that a call is fraudulent, and the accuracy of the decision model largely depends on the quantity and quality of training data, or on user-defined rules and thresholds. This implies that certain fraudulent calls will not be detected, and false positives may lead to erroneous deactivations of legitimate subscriptions. Finally, some profiling solutions merely focus on the detection of one specific fraud type. For example, WO18056925 and US20090069047A1 each provide a profiling solution for detecting bypass fraud, while US2011033032 provides a profiling solution for false answer supervision. Also the solution presented in US2010/0087191, where CDRs are compared with corresponding roaming records, is only applicable to detect SIM box fraud, and does not allow for an accurate detection in a wide range of fraud types.

It is an objective of the present invention to disclose a system and method for detecting fraud in international telecommunications traffic, that resolves the above described shortcomings of the prior art solutions. More particularly, it is an objective to present a comprehensive solution that allows to detect and classify a wide range of different fraud types, in a highly reliable way, and without having the cost of dedicated test calls.

SUMMARY OF THE INVENTION

According to a first aspect of the present invention, the above identified objectives are realized by a system for detecting fraud in international telecommunication traffic defined by claim 1, the system comprising:
- a transactions registry accessible by multiple operators and/or carriers;
- a logging module installed with those multiple operators and/or carriers configured to add an entry in the transactions registry by an operator and/or carrier handling a call, wherein an entry comprises the calling number, the called number and timing information for the call;
- a fraud detection and classification module configured to:
    select from the transactions registry a group of correlated entries representing the call, by selecting entries added by different operators and/or carriers that all relate to the call;
    compare the correlated entries to detect an anomaly due to fraud and to classify the call into a fraud type based on the anomaly.

Thus, the invention concerns a system for detecting fraud in international telecommunication traffic. Telecommunication traffic refers to the transmission of communication data, e.g. in the form of voice calls, SMS traffic, IPX traffic, signalling, etc. A call is defined as a communication in a wide sense, including e.g. a voice call, an SMS message, a data exchange, etc. An operator is a party which generates or receives international calls. For example, it may be a telecom operator having or using a mobile or wired telecommunications network. In another example, it may be a cloud communication player or an OTT (Over-The-Top) player. A source operator for a call is the operator managing the network in which the call was initiated, while a destination operator for a call is the operator terminating that call at the destination number. International telecommunication traffic or an international call implies that a call is made between two different countries, such that different national networks need to be interconnected to carry out the call. A single interconnect between the source and destination network may suffice to execute the international call, or multiple interconnects may be needed. An in-between carrier, also shortly referred to as 'carrier', refers to a party merely being responsible for the interconnection and transport of a call, without initiating or terminating the call. An interconnect facility is used to make the connection between two networks. A source operator, one or more in-between carriers, and a destination operator together handle a call. For the source operator, 'handling' refers to initiating the call, for the destination operator it refers to terminating the call, and for a carrier it refers to transporting the call. The transport and interconnect function of a carrier may be managed by a telecom operator, or may be managed by a wholesale carrier. A 'party' generally refers to an entity handling the call, e.g. a source operator, destination operator, in-between carrier, wholesale carrier, etc.

The system comprises a transactions registry accessible by multiple operators and/or carriers. This implies that an operator or carrier that participates in the system, gets access to a registry, which means they can make entries in this registry. Among the operators and/or carriers handling an international call, some may participate in the system, while others may not. Preferably, a lot of the operators/carriers do participate, however they may not be obliged to do so. The transactions registry may be a distributed registry, accessible by the parties that participate in the system.

The system further comprises a logging module installed with the multiple operators and/or carriers, configured to add an entry in the transactions registry by an operator and/or carrier handling a call, wherein an entry comprises the calling number, the called number and timing information for the call. This means a logging module is available for each of the parties that participate in the system. The logging module is used to make an entry in the transactions registry. An entry is added each time an operator or carrier handles an international call. For example, when the call is ended, each of the parties handling that call may make an entry in the transactions registry. An entry comprises information about the call being handled. In particular, an entry comprises the calling number of that call, i.e. the telephone number from which the call was made, and the called number, i.e. the destination telephone number. An entry further comprises timing information for the call. For example, timing information may be the call setup time, i.e. the moment at which ringing starts at the receiver side. In another example, timing information may be the answer time of the call, i.e. the moment at which the call is answered by the called person and media starts flowing. In another example, timing information may be the release time of a call, i.e. the moment at which the call is disconnected. In yet another example, timing information may comprise a combination of the above. Optionally, an entry may also comprise an identification of the party making the entry. In more advanced embodiments, an entry may also comprise routing information, e.g. indicating the next and/or previous carrier or operator handling the call. Optionally, information added in the transactions registry may be hashed for privacy reasons.

Every party, i.e. operator or carrier, that participates in the system and handles a call will add an entry for that call in the transactions registry. If every party handling the call participates in the system, an entry will be added for the call by the source operator, the destination operator and each of the in-between carriers. If not every party handling the call participates in the system, some of those entries will be missing. Entries will be made for every international call. Optionally, also for national calls, carried out within the national network of an operator, an entry comprising the calling number, the called number and timing information of that national call may be added in the transactions registry by an operator. This may be beneficial to recognize certain types of fraud where the last part of the international call transfer is in fact a national call terminated by the destination operator, as is e.g. the case for Simbox fraud.

A transactions registry comprising a multitude of call information added by operators and carriers has the advantage that a central place is offered where information concerning executed international calls is stored and can be analysed, opposed to local CDR databases each storing call information limited to a specific operator. Moreover, operators/carriers participating in the system merely have to log information about the calls they have handled. No dedicated calls, e.g. test calls, need to be generated.

The system further comprises a fraud detection and classification module. The fraud detection and classification module is configured to do an analysis of the information logged in the transactions registry, in order to detect fraudulent calls, and classify those fraudulent calls into a specific fraud type. The fraud detection and classification module may be implemented as a software application running centrally in a layer on top of the transactions registry.

The fraud detection and classification module is configured to select from the transactions registry a group of correlated entries representing a call, by selecting entries added by different operators and/or carriers that all relate to the call. Thus, from the multitude of entries available within the transactions registry, for different operators/carriers and different calls, a group of entries is selected. Selecting entries is based on the fact that they are correlated, in the sense that they relate to the same call. Various options are possible to select correlated entries. For example, entries may be selected based on similar timing information, e.g. having the same call setup time within tolerances. An acceptable tolerance may be a few milliseconds to a few seconds. Another example is to select entries with the same called number or the same calling number. Also a combination of parameters, e.g. the same call setup time within tolerances and the same called number, may be taken into account. It is not required, however, that all call information is identical in every entry to be selected as correlated entries. Selecting correlated entries has the advantage that it provides a robust way to find entries representing the same call. Indeed, even when the complete call chain cannot be reproduced, e.g. due to many missing entries from parties that do not participate in the system, or due to the fact that entries do not comprise routing information, correlation allows to reproduce which entries were added concerning the same call.

The fraud detection and classification module is further configured to classify the call into a fraud type based on detected anomalies during a comparison of the correlated entries. This means that the classification module is configured to, after having selected correlated entries, do a comparison. This may be a mutual comparison of entries comprised in the group of correlated entries, e.g. the calling numbers comprised in the correlated entries are mutually compared. In another example, the comparison may be a comparison of the correlated entries with entries that were expected to be present in the group of correlated entries representing a call. For example, it may be checked whether an entry is present of the operator owning the called number which was expected to terminate the call. Also a number of successive comparisons may be made.

The fraud detection and classification module is configured to, based on the performed comparison, detect anomalies. For example, an anomaly may be detected if the calling number appears not to be the same in every correlated entry. In another example, an anomaly may be detected if an expected entry of the destination operator is not found within the group of correlated entries. The fraud detection and classification module is configured to, based on the detection of specific anomalies, classify the call into a specific fraud type. For example, a set of rules or a decision logic may be used by the fraud detection and classification module to do the classification. Typically, classification takes into account a number of predefined fraud types. Fraud types may be provided at different levels of detail, e.g. first a rough classification may be done based on a first set of rules, while further detailed classification may be done based on additional rules. The outcome of the classification may be that a call is classified as a specific fraud type, or that no fraud of the predefined types was detected in the call. The latter may imply that no fraud has happened, or that another type, other than the predefined types, may have occurred.

The fraud detection and classification module has the advantage that different types of fraud may be detected. Thus, the system is not limited to the detection of a single fraud type. Moreover, the system does not only allow to detect fraud, it also allows to classify detected anomalies into a specific fraud type, i.e. it is pointed out which specific fraud type occurred during an international call. Therefore, operators and carriers can use a single system to detect various types of fraud, and to monitor which types of fraud occur. Moreover, the system only makes use of information logged from the regular call traffic. It therefore has the advantage that no dedicated test calls need to be carried out, thereby avoiding the cost and the risk of antidetection related to such test calls. Furthermore, by offering a broad view on the whole call chain of an international call, the system allows to make a better fraud analysis than when only data of a single party, e.g. CDR data of a single operator, is taken into account. The wide scope of available call information allows to do fraud detection and classification in a simple way, based on decision logic in which correlated entries are compared, without the need to build complex mathematical models, e.g. for predictive modelling. This avoids a training period related to such predictive modelling, and avoids results in terms of probabilities leading to non-detection or false positives. Instead, the system allows for a simple detection and classification logic based on comparing correlated entries, resulting in a highly-reliable detection and classification of international telecom fraud. In this way, pressure may be put on operators/carriers to no longer use cheap but fraudulent routes, or activity of certain fraudulent parties may be questioned.

Optionally, as is indicated by claim 2, the transactions registry is a distributed registry using blockchain technology. Blockchain technology provides a way to record and share information between participants in a trusted way. The Blockchain protocol manages how entries are validated, recorded and shared. For example, secure and fault resilient data logging may be obtained due to verification of authenticity of an entry through unique keys, data hashing for information security or reference to its previous entry to ensure the correctness. Moreover, using Blockchain technology implies that the transactions registry is a distributed registry, e.g. a shared ledger allowing that data is validated by participants in the system. In an example embodiment, every party may receive and work on a duplicate copy of the ledger and any update is shared with all participating parties. In other embodiments, an approach of a highly distributed ledger may be applied, but multiple parties may share a common copy of the ledger. Copies of the distributed registry may be maintained publicly, as is the case in a public Blockchain approach being open to all. In another embodiment, e.g. referred to as a private Blockchain, copies are maintained by an individual organisation. In yet another embodiment, e.g. referred to as a federated Blockchain architecture, copies are maintained by multiple organisations.

Using Blockchain technology for logging international call information in the transactions registry has the advantage that trust is created between participating parties, as it is guaranteed that the entries are valid, are authorized by a party, and have not been modified. This ensures that fraud detection is done on non-altered call information, which contributes to obtaining highly-reliable detection results. Moreover, the trust thus being created between parties contributes to obtaining a process to treat fraud incidents in a far more efficient and effective way than is currently the case. In current practice, fraud incidents are heavily disputed between parties, thereby leading to formal complaints, the need for police reports and offline CDR sharing to show anomalies, and months of delays due to multiple parties involved. Moreover, even if one party in the call chain refuses to accept the fraud claim, payments to a fraudulent party cannot be withheld. In this, often the stronger and bigger players get advantage over smaller players. The trust and transparency introduced by the presented system using Blockchain will highly simplify the fraud dispute process by eliminating the need of providing proofs e.g. through CDR sharing and police reports to withhold payments to fraudulent parties in time. With the presented system, payments against calls identified as fraudulent can be put on hold based on notification of fraud detection to all associated parties.

Optionally, as specified by claim 3, the timing information comprises the call setup time. This implies that when a call is handled by an operator or carrier, he logs the moment in time when the call is set up, i.e. the moment at which ringing starts at the receiver side.

Optionally, as is indicated by claim 4, an entry further comprises routing information. Routing information is defined as information about the call exchange between two neighbouring parties in a call chain when handling an international call. Optionally, as specified by claim 5, for a source operator handling a call, routing information may comprise an identification of the carrier to which the source operator passes the call. For a destination operator handling a call, routing information may comprise an identification of the carrier that passed the call to the destination operator. For an in-between carrier, routing information may comprise an identification of the operator or carrier handling the call prior to that carrier, and/or an identification of the operator or carrier handling that call following that carrier.

Further optionally, as specified by claim 6, the group of correlated entries is selected based on the timing information, and/or the calling number, and/or the called number. For example, entries may be selected if they all have the same call setup time, whereby some tolerance may be taken into account, e.g. a few milliseconds to a few seconds. For example, entries may be selected if they all have the same called number or the same calling number. Optionally, multiple parameters may be taken into account to select correlated entries, e.g. the same called number and the same call setup time within tolerances. Having substantially the same timing information and/or the same calling number and/or called number is an element contributing to the likeliness that those entries represent the same call.

Further optionally, as specified by claim 7, the group of correlated entries is selected based on routing information. For example, an identification of the next/previous operator/carrier in an entry may be used to reconstruct the chain of successive operators and carriers handling the call. Optionally, multiple parameters may be used to provide a more advanced selection of correlated entries, e.g. routing information may be used together with timing information, the calling number, the called number, etc.

Further optionally, as specified by claim 8, the system comprises an interface with one or more numbering plan databases and/or one or more mobile number portability databases to determine a source operator from the calling number and/or a destination operator from the called number. A numbering plan database of a country gives an overview of which telephone number is managed by which operator in that country. It may concern a numbering plan database already approved by the operators and/or the regulator in the country or a reconciled database built from inputs from operators and/or regulator in the country. Furthermore, some countries may have a mobile number portability database, providing information on how a mobile number was transferred from one operator to another. When the system interfaces with such one or more databases, this implies that for a given telephone number, an identification of the operator currently owning that number can be retrieved. In particular, for a given calling number comprised in an entry, this allows to retrieve the source operator. For a given called number comprised in an entry, this allows to retrieve the destination operator. This has the advantage that for detecting and classifying fraud by the classification module, additional information may be taken into account. For example, for a call with called number B, the operator owning number B and therefore being expected to terminate the call may be identified. If no entry from this expected destination operator is found in the group of correlated entries, this may indicate fraud has happened.

Optionally, as is indicated by claim 9, the fraud detection and classification module is configured to classify a call into a hijacking type of fraud if an entry of an operator and/or carrier that was expected to handle the call is not present in the group of correlated entries. A hijacking type of fraud is defined as a fraud type where a call to a destination number never reaches its destination, but is hijacked en route, i.e. it is terminated by a fraudulent in-between carrier. In practice, the call may be ended using e.g. an Interactive Voice Response (IVR) or a recorded message. In this type of fraud, the envisaged route is cut off: the call never reaches the carriers that were expected to carry the call after the fraudulent carrier. Moreover, the expected destination operator, owning the called number, will never handle that call. If an entry of such an expected carrier or expected destination operator is not present in the group of correlated entries, while that party participates in the system, it indicates the operator or carrier has not handled the call in reality, and thus hijacking may have occurred. As such, a simple detection and classification of hijacking fraud is obtained, with highly reliable results.

Further optionally, as specified by claim 10, in the situation where hijacking is detected based on a missing expected entry, the missing expected entry may be an entry of the expected destination operator for the call. The expected destination operator is determined from the called number comprised in the correlated entries via lookup in one or more numbering plan databases and/or one or more mobile number portability databases. This implies that the called number of a call is searched in one or more databases, after which an identification of the operator currently owning that number is given. The operator thus obtained is the expected destination operator of that call. If an entry of such an expected destination operator is not present in the group of correlated entries, while this operator participates in the system, it indicates that the expected destination operator has not handled the call in reality, and thus hijacking may have occurred.

Further optionally, as specified by claim 11, the fraud detection and classification module is configured to further classify the call as hijacking of an artificial call if the called number in the correlated entries is a number not being in use, and otherwise as hijacking of a regular call. A number not being in use e.g. means that it is an unallocated number or that it is a closed number. An unallocated number is a number recognized by a regulator or number administration authority as a valid telephone number or part of number range in the country, but that has not been allocated to the operator for business yet. A closed number is a telephone number not recognized by a regulator or number administration authority as a valid telephone number or part of number range in the country. Lookups in an external numbering plan database may be used to identify a telephone number as unallocated or closed. Hijacking of an artificial call implies that the fraudulent party on purpose launched a call with the intention to hijack it on the way. Typically, such an artificial call is a call to an unallocated or closed number, thereby not giving rise to any customer complaints. On the other hand, hijacking of a regular call implies that a real call, launched by a random retail client to an in-use allocated number, is hijacked. Making a further classification of a hijacking fraud into hijacking of an artificial call and hijacking of a regular call, allows for a more detailed view on which fraud has happened, and therefore better focussed actions to prevent it.

Optionally, as is indicated by claim 12, the fraud detection and classification module is configured to classify a call into a charge evasion type of fraud if the calling number is not identical in every of the correlated entries representing said call. A charge evasion type of fraud is defined as a type of fraud where erroneous charging by the destination operator is triggered by concealing the true origin of the international call. Charge evasion fraud thus brings a loss for the destination operator. Various variants of charge evasion fraud exist, like e.g. Simbox fraud or CLI manipulation. When charge evasion fraud occurs, at some point in the call chain the calling number is changed, thereby triggering the unfavourable charging by the destination operator. Therefore, a charge evasion type of fraud may be detected by inspecting the calling numbers available within the correlated entries representing a call. If a change in the calling number is detected, charge evasion fraud may have occurred. As such, a simple detection and classification of charge evasion fraud is obtained, with highly reliable results.

Further optionally, as specified by claim 13, the fraud detection and classification module is configured to further classify a call, already being classified as charge evasion fraud, into local Simbox fraud or bypass fraud. Particularly, the call is further classified into local Simbox fraud or bypass fraud if an entry of the destination operator of the call comprises a calling number which belongs to the local numbering plan of the country of that destination operator. Simbox fraud and bypass fraud both refer to the same type of fraud. Simbox fraud and bypass fraud are defined as a type of fraud where the interconnection facility to the destination operator is bypassed by sending the call to a SIM box, from where a local call is initiated being terminated by the destination operator. In such a case, the last part of the international call is replaced by a national call within the network of the destination operator. Provided that an operator logs national calls in the transactions registry, an entry will be made by the destination operator when he terminates the fraudulent national call being part of an international call affected by Simbox fraud. As the call was already classified as a charge evasion type of fraud, this implies different calling numbers are detected within the correlated entries. Further classification into Simbox fraud may be done by checking the nature of the altered calling number. If it appears to be a calling number belonging to the local numbering plan of the destination operator's country, the call may be further classified as Simbox fraud or bypass fraud. Making a further classification of charge evasion fraud into Simbox/bypass fraud, allows for a more detailed view on which fraud has happened, and therefore better focussed actions to prevent it.

Further optionally, as specified by claim 14, the fraud detection and classification module is configured to further classify a call, already being classified as charge evasion fraud, into CLI manipulation fraud. Particularly, the call is further classified into CLI manipulation fraud if an entry of the destination operator of the call comprises a calling number which is an international and/or a non-existing number. A non-existing number means that the telephone number is not found in any numbering plan database of any country. CLI manipulation is defined as a type of fraud where the call data, e.g. the Caller Line Identification (CLI) or calling number, is manipulated to generate a fake origin of the call for which lower source-based termination rates apply. In this type of fraud, call data is manipulated e.g. using a software program. As the call was already classified as a charge evasion type of fraud, this implies different calling numbers are detected within the correlated entries. Further classification into CLI manipulation may be done by checking the nature of the altered calling number. If it appears to be an international and/or non-existing number, e.g. only the country code may have changed, the call may be further classified as CLI manipulation. Making a further classification of charge evasion fraud into CLI manipulation fraud, allows for a more detailed view on which fraud has happened, and therefore better focussed actions to prevent it.

Optionally, as is indicated by claim 15, the timing information further comprises the answer time and/or the release time of the call. The answer time of a call is defined as the moment at which the call is answered by the called person and media starts flowing. The release time of a call is defined as the moment at which the call is disconnected.

Further optionally, as specified by claim 16, the fraud detection and classification module is configured to classify a call into a call stretching type of fraud if the chargeable call duration is not identical within tolerances in every of the correlated entries representing the call. This may happen if the answer time is not identical within tolerances in every of the correlated entries representing the call, or if the release time is not identical within tolerances in every of the correlated entries representing the call. Further optionally, as specified by claim 15, the fraud detection and classification module is configured to classify a call into a false answer type of fraud if the answer time is not identical within tolerances in every of the correlated entries representing the call, and to classify a call into a late disconnect type of fraud if the release time is not identical within tolerances in every of the correlated entries representing the call. A call stretching type of fraud is defined as a type of fraud where the call duration is artificially stretched, either by manipulating the answer time or by manipulating the release time. By manipulating the answer time, referred to as false answer type of fraud, billing will start earlier than the actual start of the conversation, e.g. by first playing a recorded ringing tone when the call is answered. This type of fraud may therefore be detected based on different values of answer times, within tolerances, being comprised in the correlated entries representing said call. By manipulating the release time, referred to as late disconnect fraud, end of billing will be delayed, e.g. by repeating the recorded conversation after the real conversation has ended. This type of fraud may therefore be detected based on different values of release times, within tolerances, being comprised in the correlated entries representing said call.

Further optionally, as specified by claim 18, the system further comprises a fraudster identification module configured to:
arrange the group of correlated entries into a sequence representing the chain of handling a call by multiple operators and/or carriers;
compare neighboring entries in that sequence to identify one or more plausible fraudsters.

Thus, the system further comprises a fraudster identification module. Where the fraud detection and classification module is configured to detect fraud and to classify it in a fraud type, the fraudster identification module has the function to identify which party handling the call is responsible for the fraud. The fraudster identification module is configured to first arrange the group of correlated entries into a sequence representing the chain of handling a call by multiple operators and/or carriers. This implies that entries representing a call are placed in an order corresponding to the successive parties handling the call. For example, such a sequence may be built using routing information comprised in the entries. The fraudster identification module is further configured to compare neighboring entries in that sequence to identify one or more plausible fraudsters. For example, comparing neighbouring entries may imply that the calling numbers are compared to identify at which point in the call chain the calling number was changed. The party having changed the calling number may be identified as fraudulent. In another example, comparing neighbouring entries may imply that routing information is compared to identify where an entry is missing in the call chain, as it is plausible that a fraudulent party will not participate in the system. In some cases, e.g. when all parties handling the call have added an entry, it may be possible to identify the fraudulent party with a degree of certainty. In other cases, e.g. when a lot of parties handling the call do not participate in the system, multiple parties may be identified as plausible fraudsters.

Further optionally, as specified by claim 19, the sequence is arranged based on routing information comprised in the correlated entries. For example, an entry of the source operator comprising an identification of the next carrier, is linked to an entry of that carrier, etc. In this way, the call chain of successive operators and/or carriers is reconstructed.

Optionally, as indicated by claim 20, the system further comprises a notification and reporting module, configured to transmit and/or store and/or process one or more results of the fraud detection and classification module and/or the fraudster identification module. For example, the notification and reporting module may be configured to swiftly notify an operator or carrier about detected fraud and identified fraudulent parties, as soon as the fraud has been detected or the fraudulent party has been identified. In an example embodiment, a notification may be sent to all parties that did an entry belonging to the group of correlated entries. In another embodiment, also the expected source operator or expected destination operator whose numbering range was used but never initiated or terminated the call may be notified.

In this way operators may adapt their routings to avoid that future calls are handled by a fraudulent party. In another example, the notification and reporting module may be configured to draw up statistics to provide an overview of the occurring types of fraud and to monitor their evolution. This has the advantage that time-consuming surveys are avoided. Moreover, provided statistics may allow to reveal additional types of fraud. For example, an operator being presented an overview of how much traffic was received from various carriers, may identify an abnormally high amount of traffic coming from one specific carrier with which special low termination rates were agreed. This may indicate that refiling fraud occurred.

According to a second aspect of the present invention, the above identified objectives are realized by a method for detecting fraud in international telecommunication traffic defined by claim 21, the system method comprising the steps of:
providing a transactions registry accessible by multiple operators and/or carriers;
adding an entry in the transactions registry by an operator and/or carrier handling a call, wherein an entry comprises the calling number, the called number and timing information for the call;
selecting from the transactions registry a group of correlated entries representing the call, by selecting entries added by different operators and/or carriers that all relate to the call
classifying the call into a fraud type based on detected anomalies during a comparison of the correlated entries based on the anomaly.

BRIEF DESCRIPTION OF THE DRAWINGS

FIGS. 8a and 8b illustrate two different embodiments of how a call stretching type of fraud may be detected by the fraud detection and classification module.

DETAILED DESCRIPTION OF EMBODIMENT(S)

Figure 1:
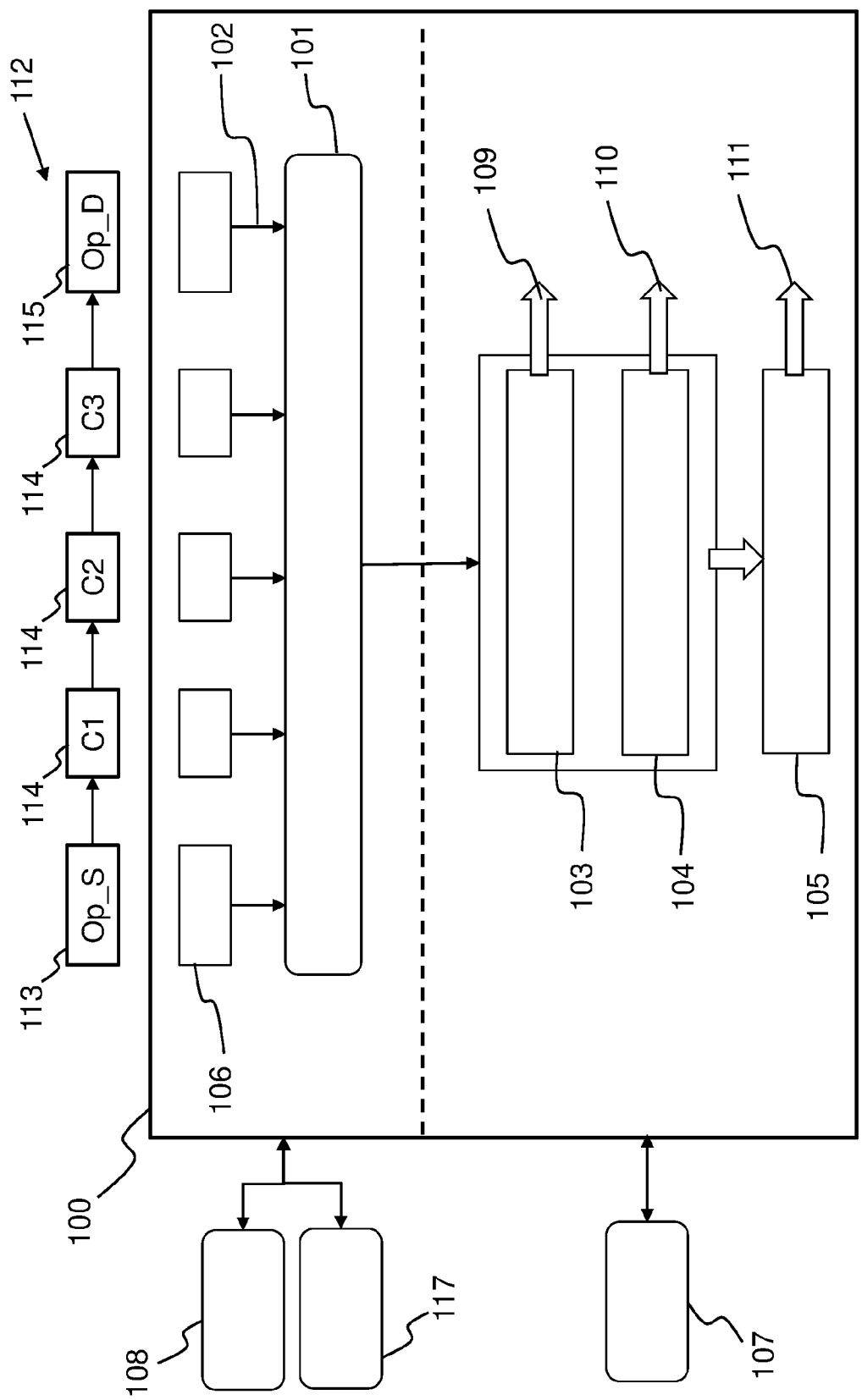
FIG. 1 illustrates an embodiment of a system for detecting fraud in international telecommunication traffic.

FIG. 1 illustrates an embodiment of a system 100 for detecting fraud in international telecommunication traffic. In the example of FIG. 1 a source operator 113 Op_S, in-between carriers 114 C1, C2, C3, and a destination operator 115 Op_D handle an international call, represented by a call chain 112. A call may be a voice call, SMS message, data exchange, etc. The source operator 113 Op_S initiates the call, and the destination operator 115 Op_D terminates it. The in-between carriers 114 C1, C2, C3, also referred to as 'carriers', are responsible for transporting the call over their network. Typically, the networks of Op_S, C1, C2, C3 and Op_D are different national networks, and an interconnect facility is used to make the connection between two networks. A carrier 114 may be managing the transport and interconnect himself, or a wholesale carrier may be responsible for this.

In the example of FIG. 1 each of the parties handling the call, i.e. Op_S, C1, C2, C3 and Op_D, participate in the system 100 for detecting fraud. Therefore, they each have a logging module 106, configured to make an entry 102 in a transactions registry 101 when handling a call. For example, the transactions registry 101 may be a distributed registry. Optionally, an interface may be available with a numbering plan database of a country 108 and/or a mobile number portability database 117, e.g. to determine the expected source operator and expected destination operator. In another embodiment, numbering plan information and/or mobile number portability information may be integrated within the system 100, instead of being retrieved by interfacing with a database 108, 117.

In the embodiment of FIG. 1, the system 100 comprises a fraud detection and classification module 103 and a fraudster identification module 104. Both modules 103 and 104 are configured to analyse the data logged in the transactions registry 101. They may be implemented as a software application running centrally in a layer on top of the transactions registry 101. The fraud detection and classification module 103 is configured to detect fraud in an international call and to classify it in a fraud type 109. The fraudster identification module 104 is configured to identify the party being fraudulent or a number of plausible fraudsters 110. The modules 103 and 104 may be configured to use additional information, e.g. a request may be done to a local CDR database of an operator 107 to retrieve information on national calls, as is illustrated in FIG. 1. In another embodiment, no data exchange with a local CDR database 107 may be present, e.g. when apart from international calls, also call information of national calls is added in the transactions registry 101. The system 100 of FIG. 1 further comprises a notification and reporting module 105, configured to transmit and/or store and/or process one or more results of the fraud detection and classification module 103 and/or the fraudster identification module 104.

FIGS. 2a, 2b, 2c, 2d and 2e, illustrate different embodiments of the logging module 106 and transactions registry 101. The transactions registry 101 may be a distributed registry, e.g. a shared ledger using blockchain technology. This implies every party 113, 114, 115 participating in the system 100 will work on a duplicate copy of the shared ledger 101. In an example embodiment, every party receives a duplicate copy of the ledger and any update is shared with all participating parties. In other embodiments, multiple parties may share a common copy of the ledger. Copies of the distributed registry may be maintained publicly, as is the case in a public Blockchain approach being open to all. In another embodiment, e.g. referred to as a private Blockchain, copies are maintained by an individual organisation. In yet another embodiment, e.g. referred to as a federated Blockchain architecture, copies are maintained by multiple organisations. Using a private Blockchain system where verification is limited to participating parties, may be advantageous to avoid an unacceptably high processing power. A participant will have permission to join the Blockchain network and insert entries into the transactions registry 101. Participants may be recognised through a unique public key, e.g. a cryptographic key. A private key may be secret to the participant and will be used in conjunction with the public key during authentication, interactions, encryptions and decryptions.

An entry 102 added by a participating party comprises call information. Call information comprises the called number, the calling number and timing information for the call. For example, it is added by each party handling the call when the call ends. For example, the following call information may be logged by the parties handling the call:
  public key of the party;
  calling number;
  called number;
  timing information: call setup time, answer time, release time;
  function of the party: source operator or destination operator or in-between carrier.
  routing information: for the source operator 113: next carrier 114, for an in-between carrier 114: next and previous carrier/operator, for the destination operator 115: previous carrier 114. For privacy reasons, information like a calling number or called number may be hashed using a hashing algorithm.

Optionally, the system 100 may comprise an application to control the standardization and enrichment of the entries 102 before they are added in the transactions registry 101. Standardization may imply that an entry 102 is converted into a standard format which is accepted and agreed by all the parties. This may e.g. be needed to overcome inconsistencies in phone number formats or timestamp formats. Enrichment of the entries 102 may e.g. imply that information is looked up in a numbering plan database of a country 108 and/or a mobile number portability database 117, e.g. to determine the expected source operator and expected destination operator. The expected source operator and expected destination operator are the operators that are, given the calling number and called number of the call in an entry 102, expected to respectively initiate and terminate the call. In a Blockchain architecture, the standardization and enrichment functions may be implemented in the form of smart contracts which define a set of business, storage or information security rules, where these rules are executed automatically when an entry 102 is added in the transactions registry 101. For example, rules may be defined for initiating hashing of personally identifiable information such as phone numbers, for converting timestamps, or for identifying the expected source operator and expected destination operator.

Permissions may be defined to govern the access control over the data set available within the transactions registry 101. For example, normal parties may be authorized to append new entries 102 and to view only data related to entries 102 they have inserted themselves, while an auditor may be given read only access to a broader range of data.

A consensus logic may be used to approve a transaction, represented by an entry 102 added in the transactions registry 101. Typically, in the context of international call handling, time may be limited to reach such a consensus during handling a call. Therefore, the consensus concept may be applied afterwards, i.e. after the call has been executed anomalies are identified.

Figure 2A:
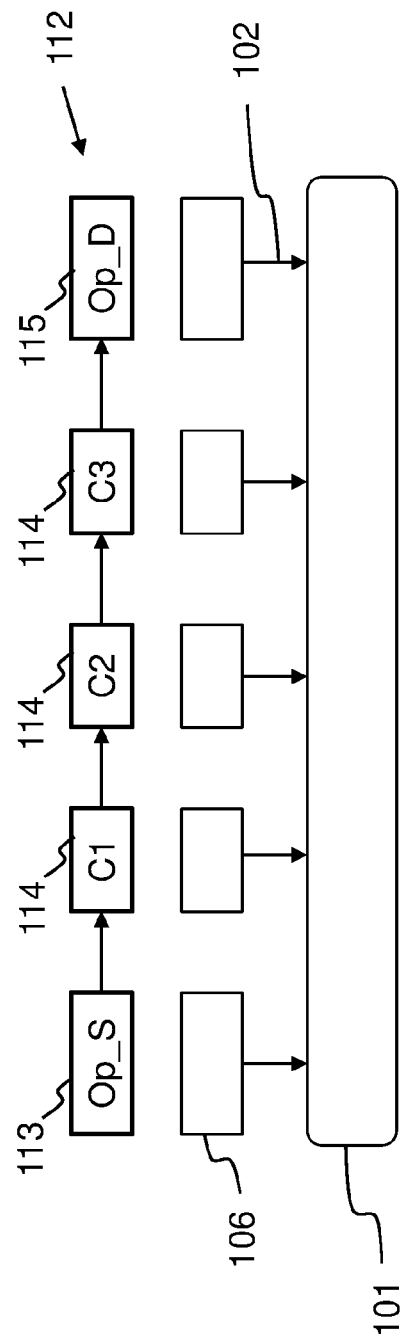
FIGS. 2a, 2b, 2c, 2d and 2e, illustrate different embodiments of the logging module and transactions registry.
Figure 2B:
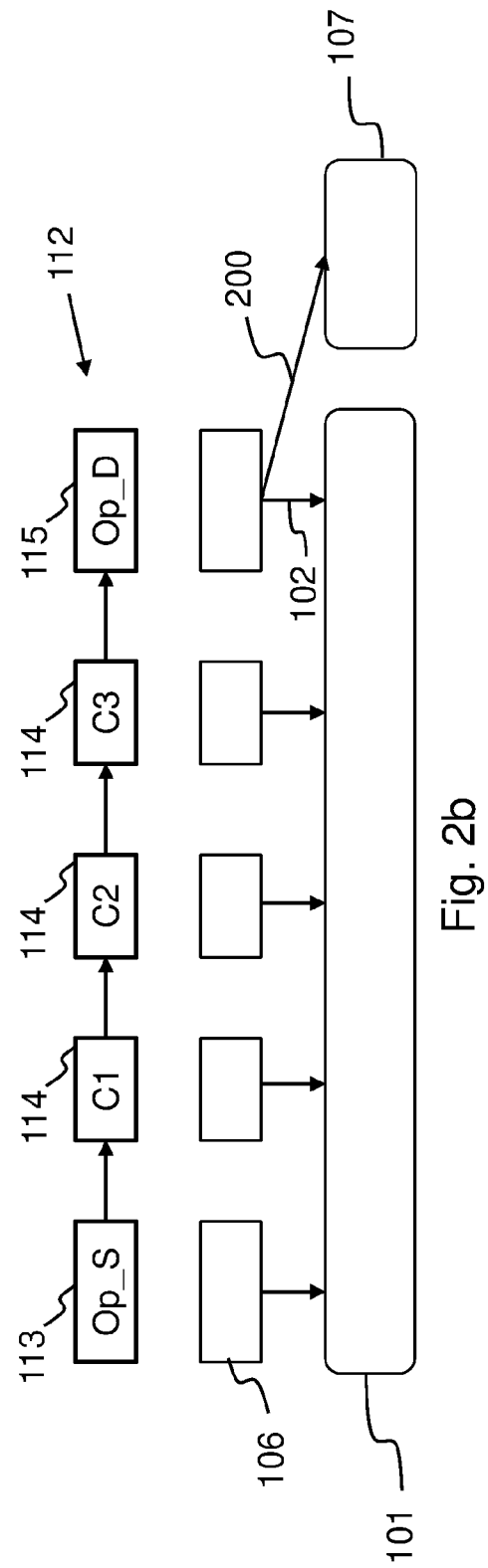

In the embodiment of FIG. 2a all parties handling the call, i.e. the source operator 113, carriers 114 and destination operator 115 participate in the system. Therefore, when handling an international call, every party adds an entry 102 in the transactions registry 101. Optionally, an operator may also add an entry in the transactions registry 101 for national calls, carried out within his national network. This may be beneficial to recognize certain types of fraud where the last part of the international call transfer is in fact a national call terminated by the destination operator, as is e.g. the case for Simbox fraud. Alternatively, as is illustrated in FIG. 2b, an entry 102 in the transactions registry 101 is only done when handling an international call, and entries 200 for executed national calls are added in a local CDR database 107 managed by the operator 115.

Figure 2C:
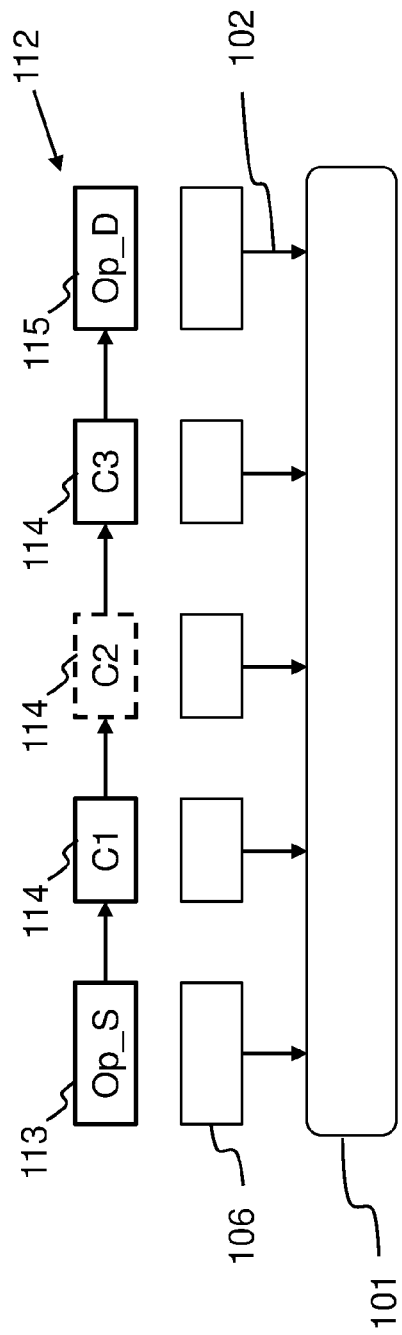
Figure 2D:
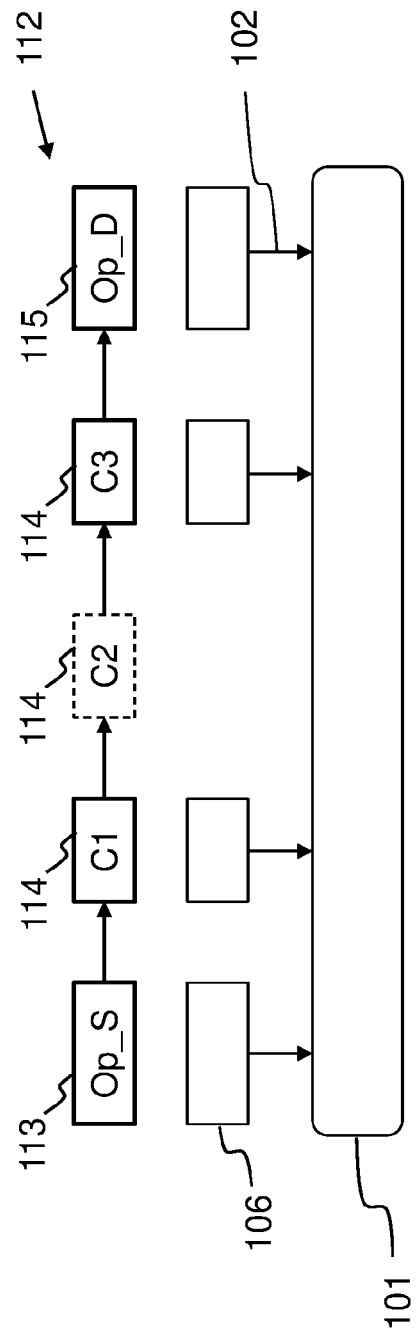
Figure 2E:
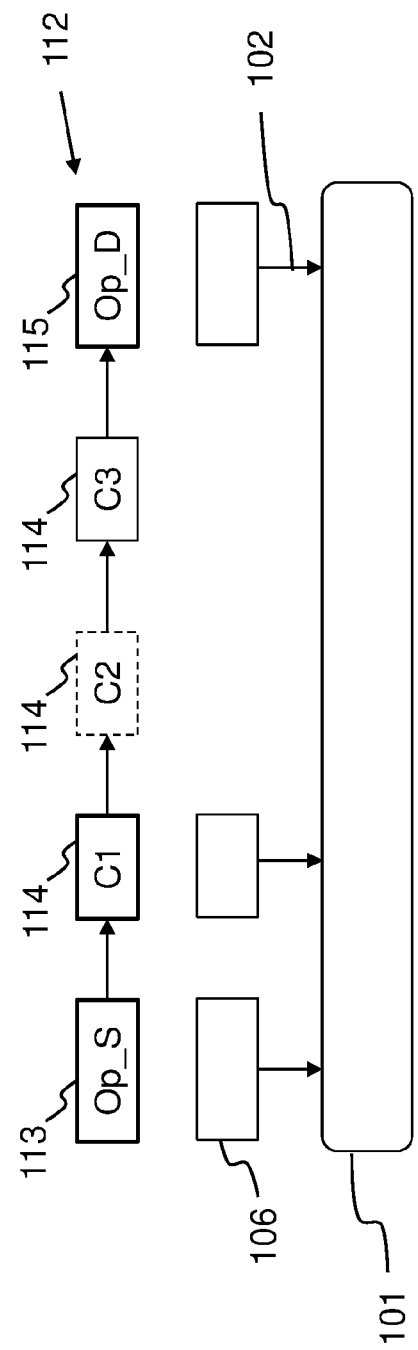

FIGS. 2c, 2d and 2e illustrate that not every operator and carrier may be obliged to participate in the system. In these figures, parties participating in the system are indicated by a bold rectangle in the call chain 112. A party indicated by a rectangle in dashed line refers to a fraudulent party. In FIG. 2c also the fraudulent party, namely carrier C2 participates in the system and makes entries in the transactions registry 101. In practice, however, it is plausible that a fraudulent party will not participate in the system, as is illustrated in FIG. 2d. Finally, FIG. 2e shows that multiple parties, being fraudulent or non-fraudulent, may not participate in the system, resulting in missing entries for that parties handling the call.

Figure 3:
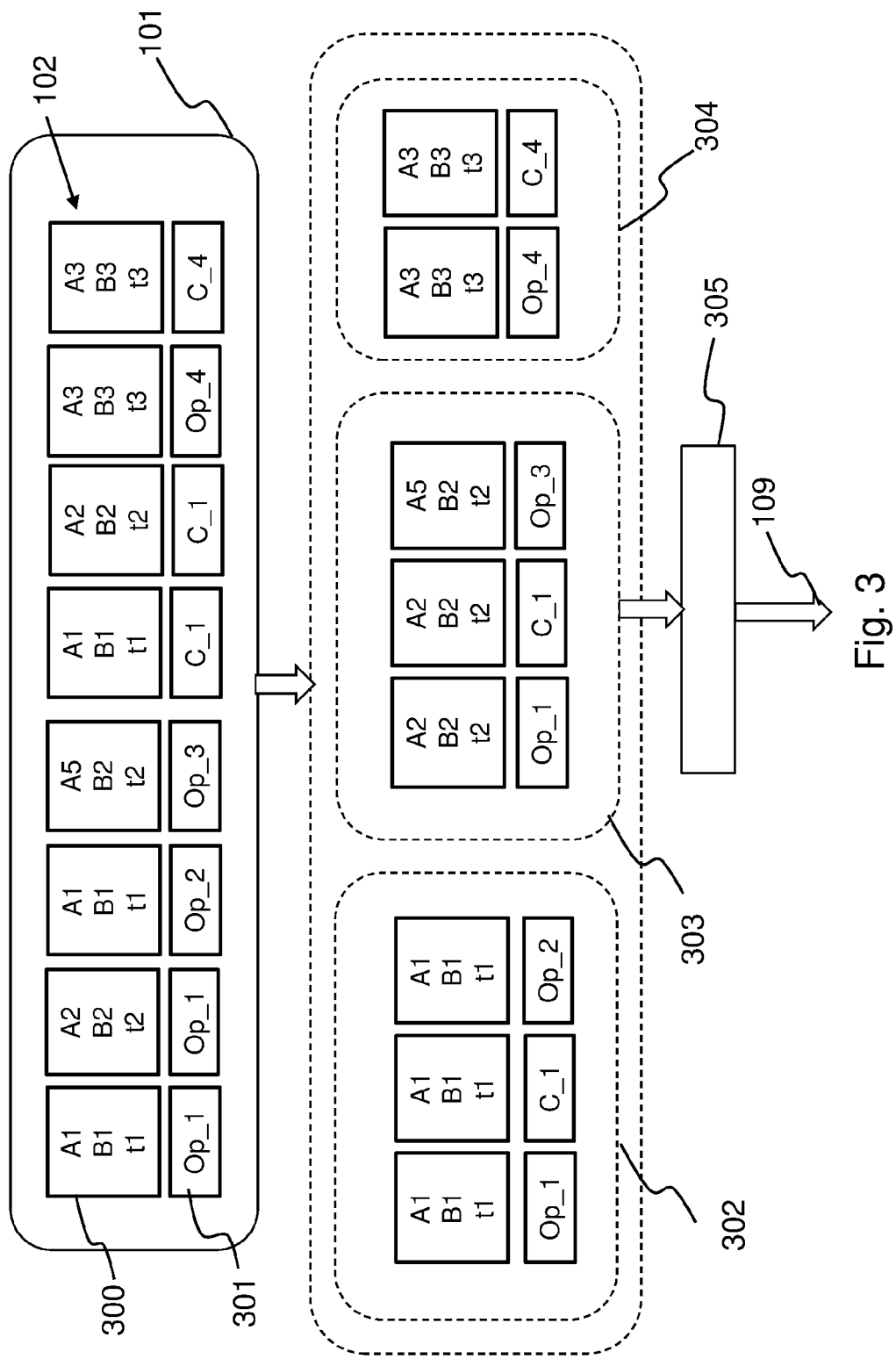
FIG. 3 illustrates an embodiment of a selection logic which may be implemented in the fraud detection and classification module.

FIG. 3 illustrates an embodiment of a selection logic which may be implemented in the fraud detection and classification module 103. FIG. 3 shows the transactions registry 101, in which multiple entries 102 are available. An entry 102 was added by an operator or carrier when handling a call. In the example of FIG. 3 an entry 102 comprises an identification of the party 301 and call information 300 comprising the calling number, called number and call setup time. FIG. 3 further illustrates how three groups of correlated entries, resp. 302, 303 and 304, are selected from the transactions registry 101. Each group of correlated entries represents a call, i.e. they were added to the transactions registry by multiple parties when handling the same call. Various kinds of selection logic may be used to select groups of correlated entries. In the example of FIG. 3 correlated entries are selected based on the call setup time and called number, i.e. entries 102 having the same call setup time and the same called number are grouped together. In other example embodiments, correlated entries may be selected based on the calling number, other types of calling information, e.g. the answer time or release time, etc. In yet another example embodiment, correlated entries may be selected by linking entries to reconstruct the call chain, using routing information included in the entries, e.g. an identification of the next and/or previous carrier.

In practice, discrepancies in the timing information of a few milliseconds to a few seconds may exist between the parties handling the call. This means that e.g. the call setup time added by different parties is not identical in every correlated entry, though they all concern the same call. Therefore, a tolerance of a few milliseconds to a few seconds may be taken into account when selecting correlated entries based on timing information.

FIG. 3 further illustrates that a group of correlated entries 303 representing a call is given to a decision logic 305, being comprised in the fraud detection and classification module 103, in order to classify that call into a fraud type 109.

Figure 4:
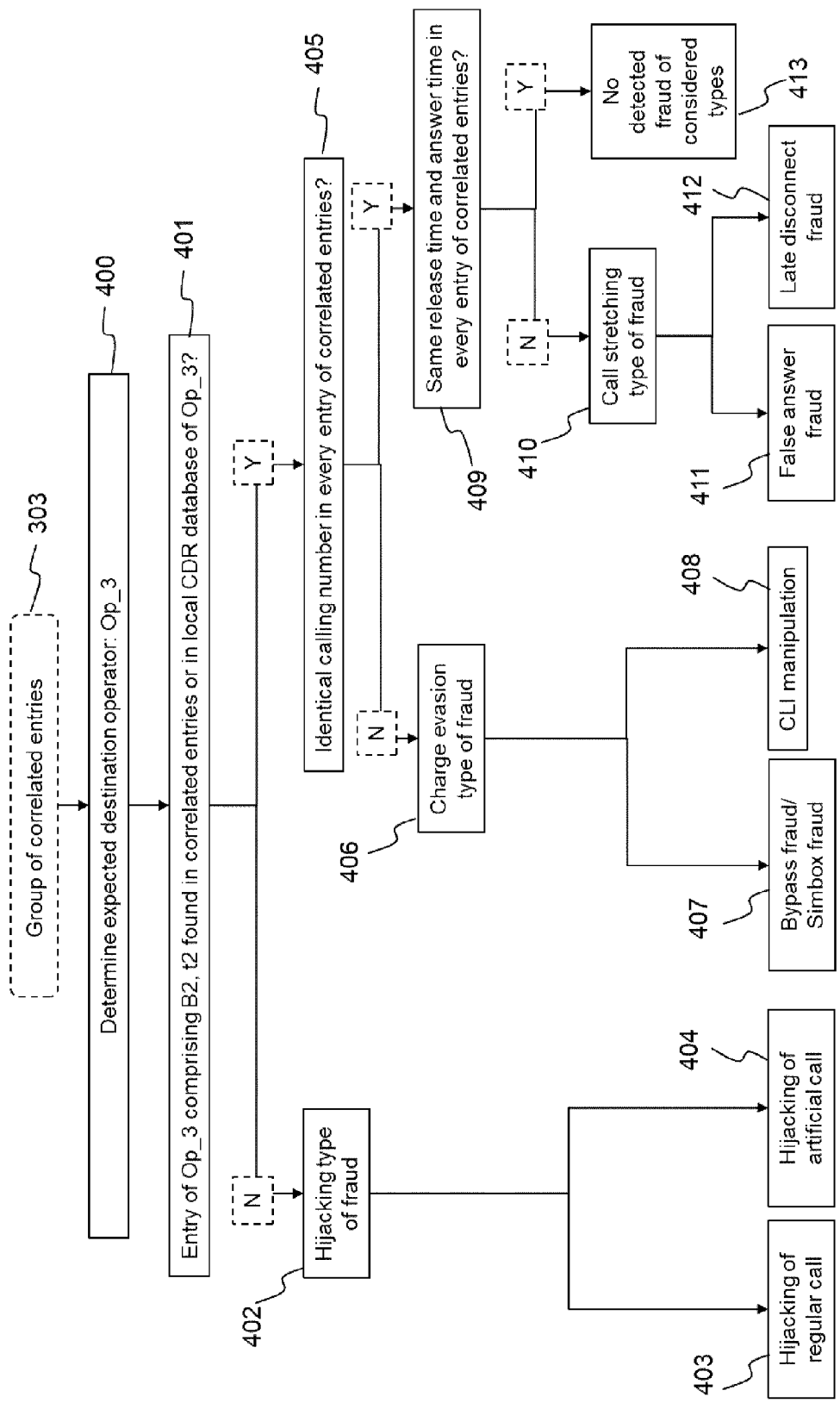
FIG. 4 shows an embodiment of a decision logic which may be implemented in the fraud detection and classification module.

FIG. 4 shows an embodiment of a decision logic 305 which may be implemented in the fraud detection and classification module 103. The decision logic starts from a selected group of correlated entries 303. Referring to FIG. 3, the correlated entries 303 comprise a called number B2 and a call setup time t2. In step 400 of the decision logic of FIG. 4, first the expected destination operator is determined. This may be done by interfacing with one or more numbering plan databases 108 and/or mobile number portability databases 117, i.e. the called number B2 available within the group of correlated entries 303 is looked up in a database 108, 117 and the corresponding operator Op_3 is retrieved. Next, in step 401 it is verified whether an entry is found of the expected destination operator in the group of correlated entries 303 comprising the same called number B2 and the same call setup time t2 within tolerances. If such an entry is not found, it indicates that the call has not reached its destination, and was hijacked on the way. It is therefore classified as a hijacking type of fraud 402. A further classification into hijacking of a regular call 403 and hijacking of an artificial call 404 may be done. For example, if the called number is an unallocated number or a closed number, the call may be classified into hijacking of an artificial call 404. An unallocated number is a number recognized by a regulator or number administration authority as a valid telephone number or part of number range in the country, but that has not been allocated to the operator for business yet. A closed number is a telephone number not recognized by a regulator or number administration authority as a valid telephone number or part of number range in the country. Lookups in an external numbering plan database 108 may be used to identify a telephone number as unallocated or closed.

In an example embodiment, information from national calls may not be logged in the transactions registry 101, but may be stored in a local CDR database managed by an operator. In order to prevent that in such a case a call with Simbox fraud, where the destination operator terminates a local call, is being classified as a hijacking type of fraud, the expected entry of the destination operator may also be searched in a local CDR database of that operator. I.e. a request my be sent to such a database to check whether an entry was made for a national call with called number B2 and call setup time t2. In another embodiment, besides information from international calls also national calls may not be logged in the transactions registry 101. In such a case no request to a local CDR database is needed.

If the call is not classified as a hijacking type of fraud 404, a step 405 of the decision logic is performed, i.e. it is checked whether every of the correlated entries 303 comprises the same calling number. If this is not the case, the call is classified as a charge evasion type of fraud 406. A further classification may be done into Simbox fraud or bypass fraud 407 on the one hand, and CLI manipulation 408 on the other hand. Such a further classification me be done by analysing the nature of the altered calling number. If it appears to be a calling number belonging to the local numbering plan of the destination operator, the call may be further classified as Simbox fraud or bypass fraud 407. If it appears to be an international number and/or a non-existing number in the external numbering plan databases for any country, e.g. only the country code may have changed, the call may be further classified as CLI manipulation 408.

If the call is not classified as charge evasion type of fraud 406, a step 409 of the decision logic of FIG. 4 is performed. In this step 409 it is checked whether the same answer time and release time, within tolerances, occur in every of the correlated entries 303. For this purpose, the timing information of an entry 102 further comprises the answer time and release time. If different answer times and/or release times, within tolerances, are found, the call is classified as a call stretching type of fraud 410. A further distinction may be made between false answer fraud 411 and late disconnect fraud 412, e.g. by identifying resp. the answer time was altered or the release time was altered.

Finally, FIG. 4 shows that if step 409 in the decision logic gives a positive result, it is concluded that no fraud of the considered types was detected. This may mean no fraud occurred, or fraud of yet another type occurred.

FIG. 4 illustrates one possible embodiment of the decision logic used by the fraud detection and classification module 103. Various other embodiments are possible however, using a different order of the steps being performed, performing additional steps or leaving certain steps out, using other information to be compared, interfacing with other data sources, etc.

Figure 5A:
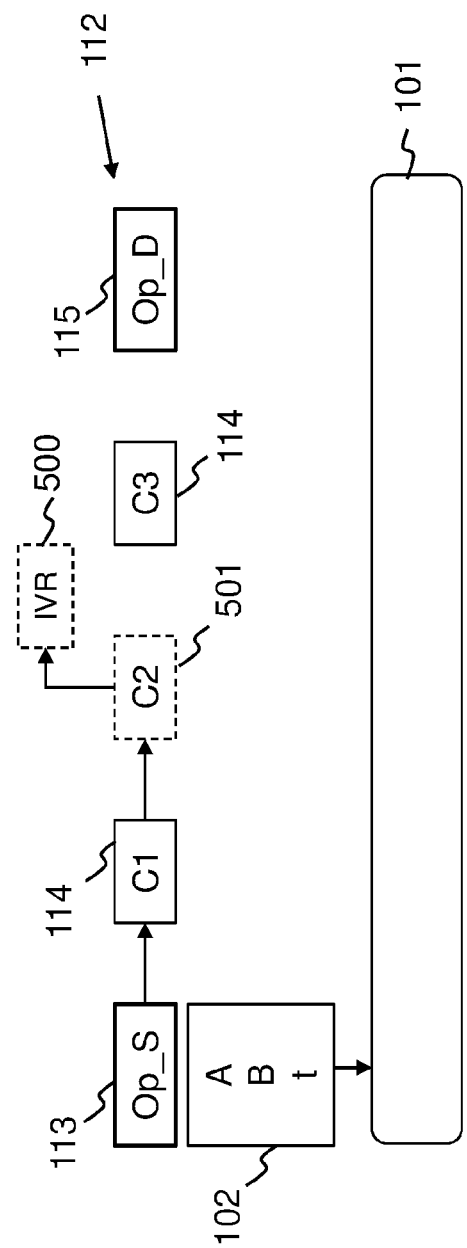
FIGS. 5a and 5b illustrate two different embodiments of how a hijacking type of fraud may be detected by the fraud detection and classification module.
Figure 5B:
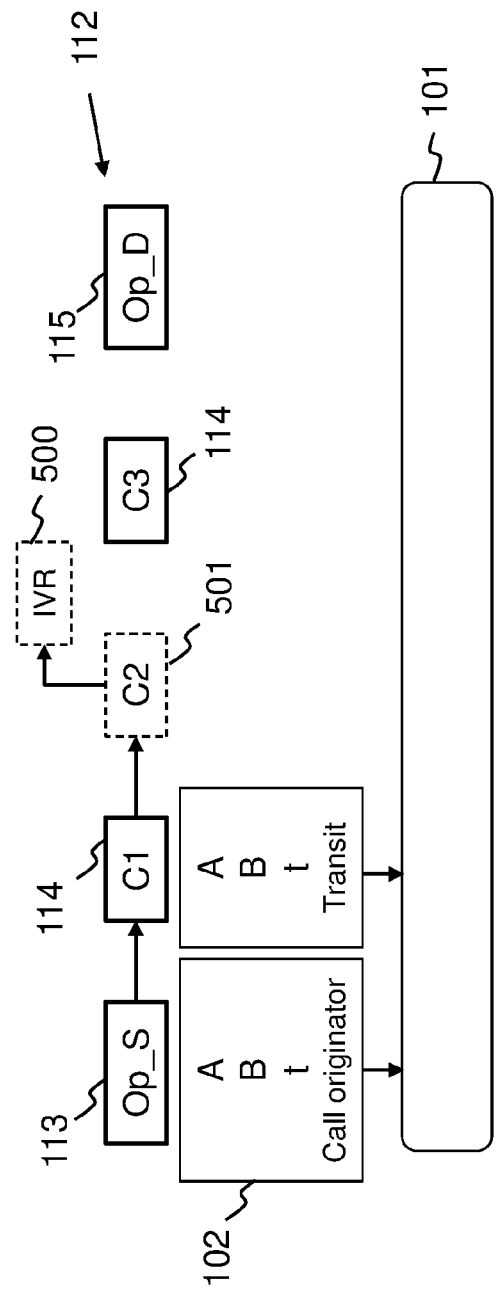

FIG. 5, FIG. 6, FIG. 7 and FIG. 8 further illustrate various embodiments of how different types of fraud may be detected by the classification module 103. FIGS. 5a and 5b illustrate two different embodiments of how a hijacking type of fraud may be detected. FIGS. 5a and 5b show a call chain 112 which was foreseen to handle a call, but due to hijacking of the call by a fraudulent carrier 501, the call never reaches the foreseen destination operator 115. In the example of FIG. 5, the call is hijacked by terminating it in the network of the fraudulent carrier 501, using an IVR 500. In the embodiment of FIG. 5a an entry 102 in the transactions registry 101 only comprises the calling number A, the called number B and the call setup time t. Furthermore, only the source operator 113 and destination operator 115 are participating in the system; the in-between carriers 114 do not add entries 102. Based on the available entries 102 in the transactions registry 101, detection of the hijacking fraud may be done by determining the expected destination operator using a lookup of the called number B in a numbering plan database. Next, it may be detected that no entry 102 from the expected destination operator 115 is available in the transactions registry 101 for that call.

In the embodiment of FIG. 5b additional call information is included in an entry 102. An entry 102 here comprises the calling number A, the called number B, the call setup time t and a parameter indicating the function of the party making the entry 102. The function may e.g. be 'call originator', 'transit' or 'call terminator'. No interface with a numbering plan database is available here. Here, the call may be classified as hijacking based on the fact that no entry comprising the function 'call terminator' is found for that call.

Figure 6A:
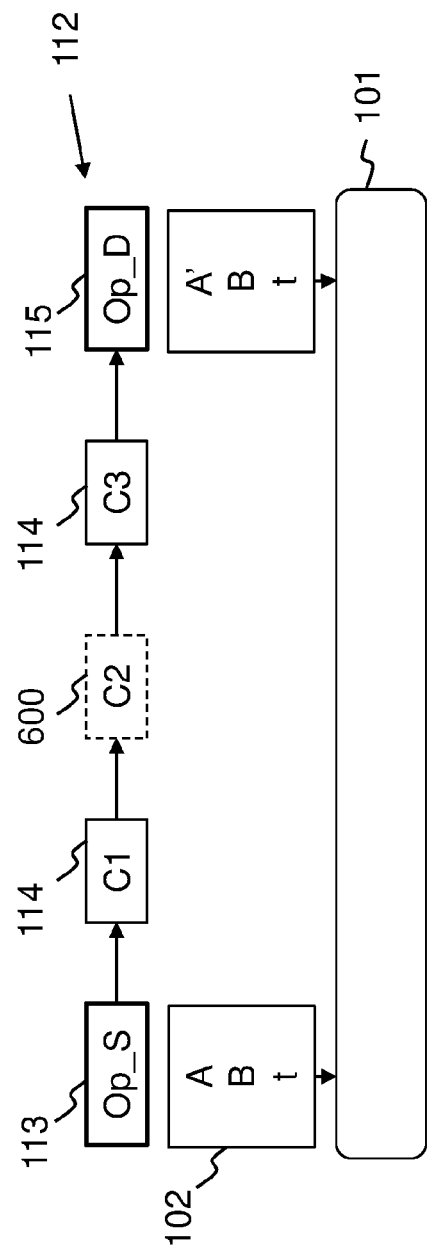
FIGS. 6a and 6b illustrate two different embodiments of how a CLI manipulation fraud may be detected by the fraud detection and classification module.
Figure 6B:
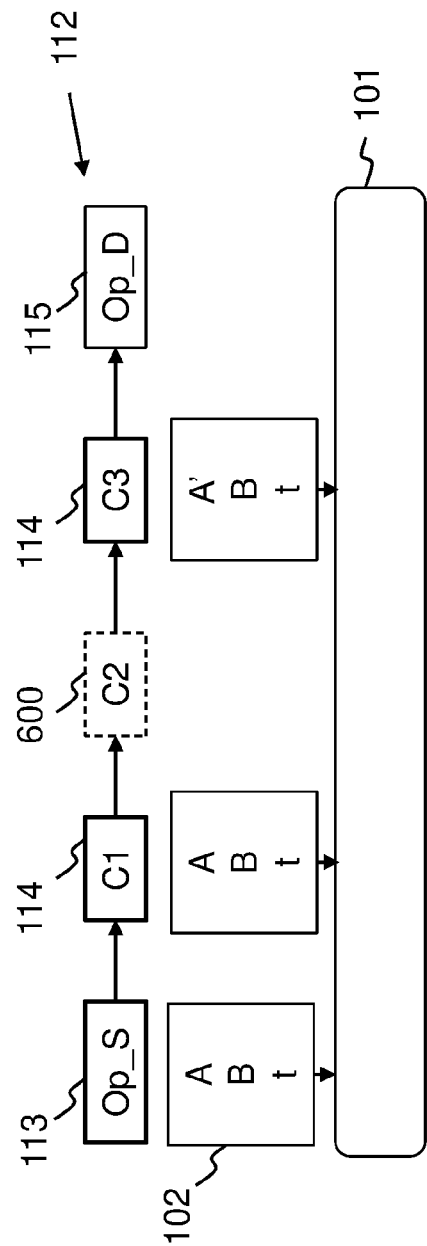

FIGS. 6a and 6b illustrate two different embodiments of how a CLI manipulation fraud may be detected by the fraud detection and classification module. In the embodiments shown by FIGS. 6a and 6b an entry comprises the calling number A, the called number B and the call setup time t. In FIGS. 6a and 6b, a fraudulent party 600 has used a software program to change the calling number A into A'. In the embodiment of FIG. 6a only the source operator 113 and the destination operator 115 participate in the system. Here, the CLI manipulation may be detected by the classification module 103 by identifying two different calling numbers, A resp. A', within the entries of the source operator 113 and the destination operator 115. Moreover, it may be detected that the calling number A' is an international or a number not existing in the numbering plan of any country. In another embodiment, as illustrated in FIG. 6b, the destination operator 115 does not participate in the system, but the in-between carriers 114 do. Here, the entry 102 added by carrier C3 will reveal that the calling number has been altered.

Figure 7A:
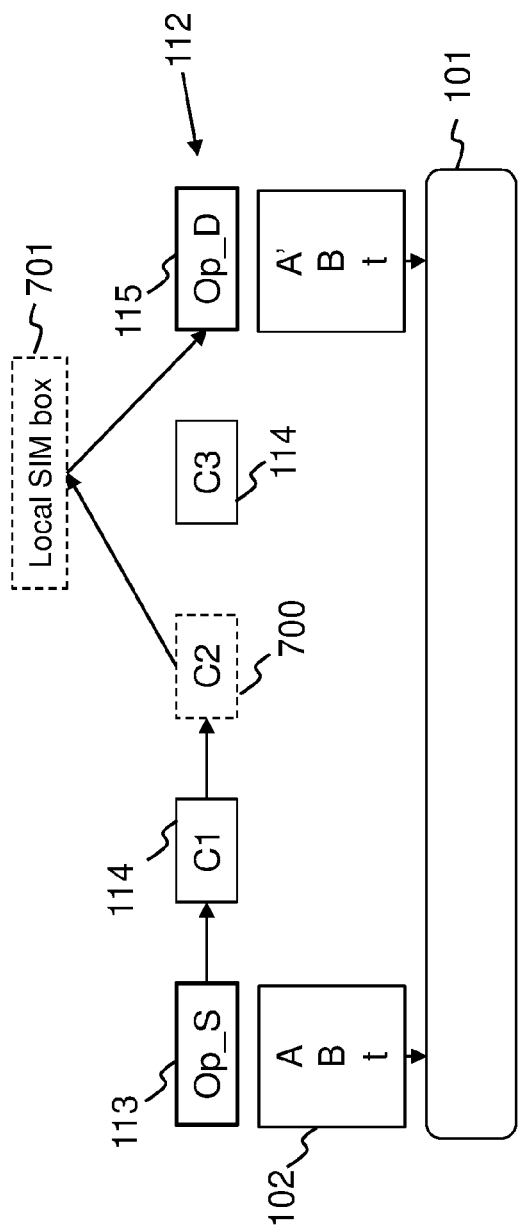
FIGS. 7a and 7b illustrate two different embodiments of how local Simbox fraud may be detected by the fraud detection and classification module.
Figure 7B:
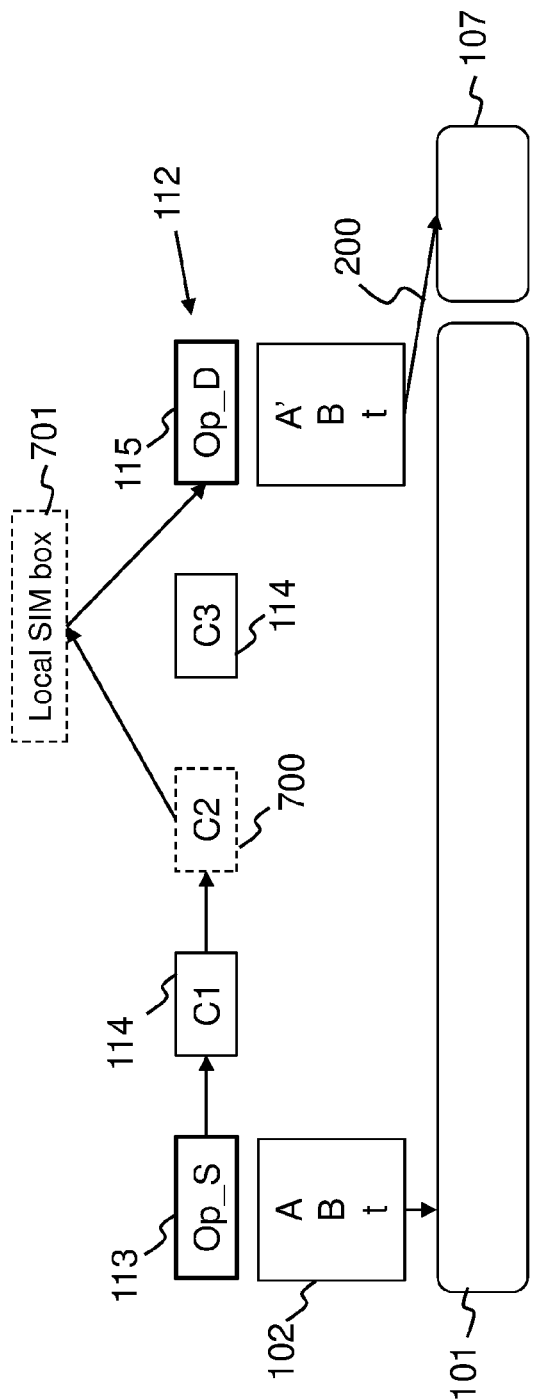

FIGS. 7a and 7b illustrate two different embodiments of how local Simbox fraud may be detected by the fraud detection and classification module 103. A fraudulent carrier 700 terminates the call using a local SIM box 701. Consequently, the last part of the international call is now a national call terminated by the destination operator 115. Similar to the detection in FIG. 6, the call will be classified as charge evasion type of fraud based on the different calling numbers A and A' in the entries 102 from the source operator 113 and destination operator 115. In the embodiment of FIG. 7a the destination operator 115 also logs national calls into the transactions registry 101. Therefore, an entry 102 of the destination operator 115 with called number B, call setup time t and in which the altered calling number A' is a local number owned by the destination operator 115, is available in the transactions registry 101. In the embodiment of FIG. 7b the destination operator 115 does not log national calls into the transactions registry 101. Instead, the destination operator 115 logs the information concerning national calls in a local CDR database 107. Therefore, a request may be sent to the destination operator 115 in order to retrieve an entry 200 from the local CDR database 107 showing the altered calling number A' which is a national number owned by the destination operator 115.

Figure 8A:
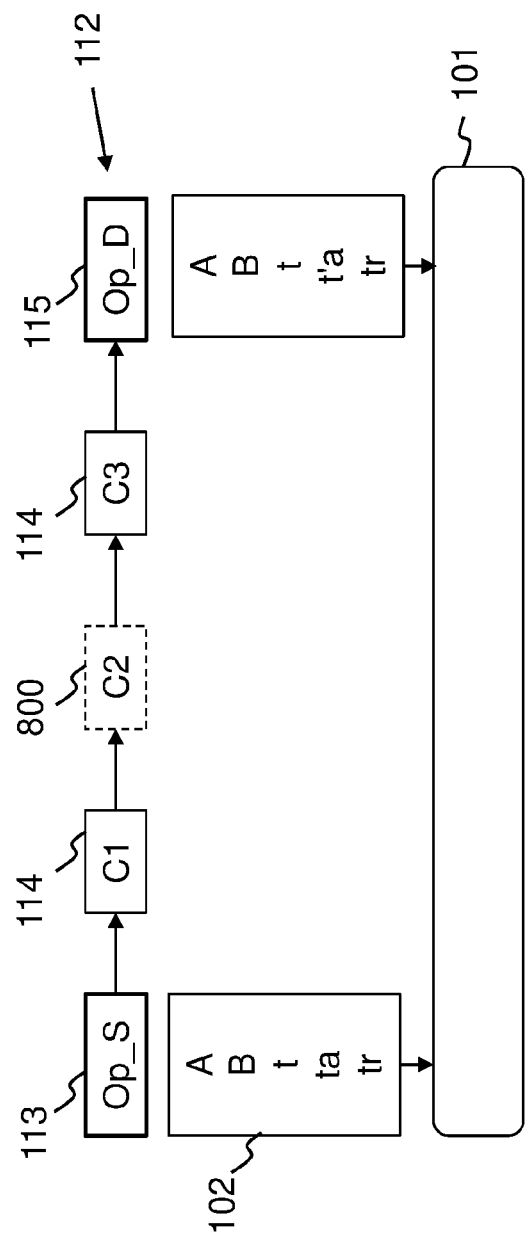

FIGS. 8a and 8b illustrate two different embodiments of how a call stretching type of fraud may be detected by the fraud detection and classification module 103. An entry 102 comprises the calling number A, the called number B, the call setup time t, the answer time ta and the release time tb of the call. A fraudulent carrier 800 falsely stretches the call by shifting either the answer time, the release time or both of them. Classification into a call stretching type of fraud may be based on the detection that the answer time has changed from ta to t' a in entries 102 representing the same call, as is illustrated in FIG. 8a, or based on the detection that the release time has changed from tr to t'r in entries 102 representing the same call, as is illustrated in FIG. 8b.

Figure 9A:
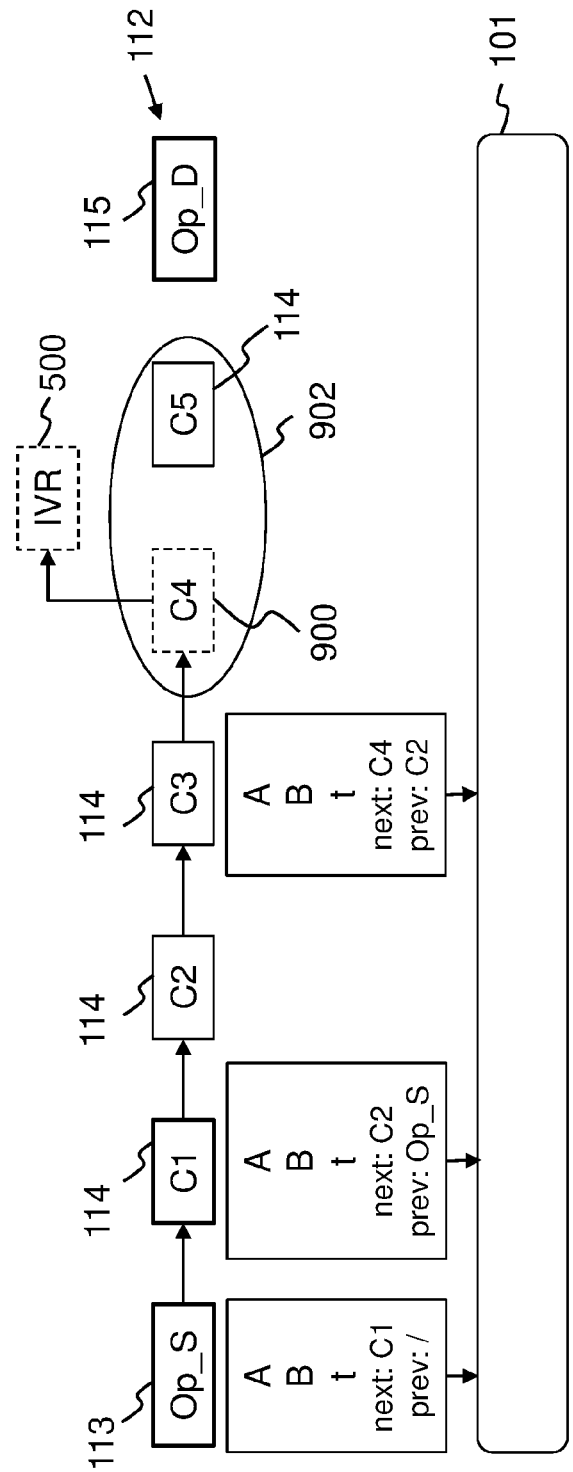
FIGS. 9a and 9b illustrate two different embodiments of how a fraudulent party may be identified by the fraudster identification module.
Figure 9B:
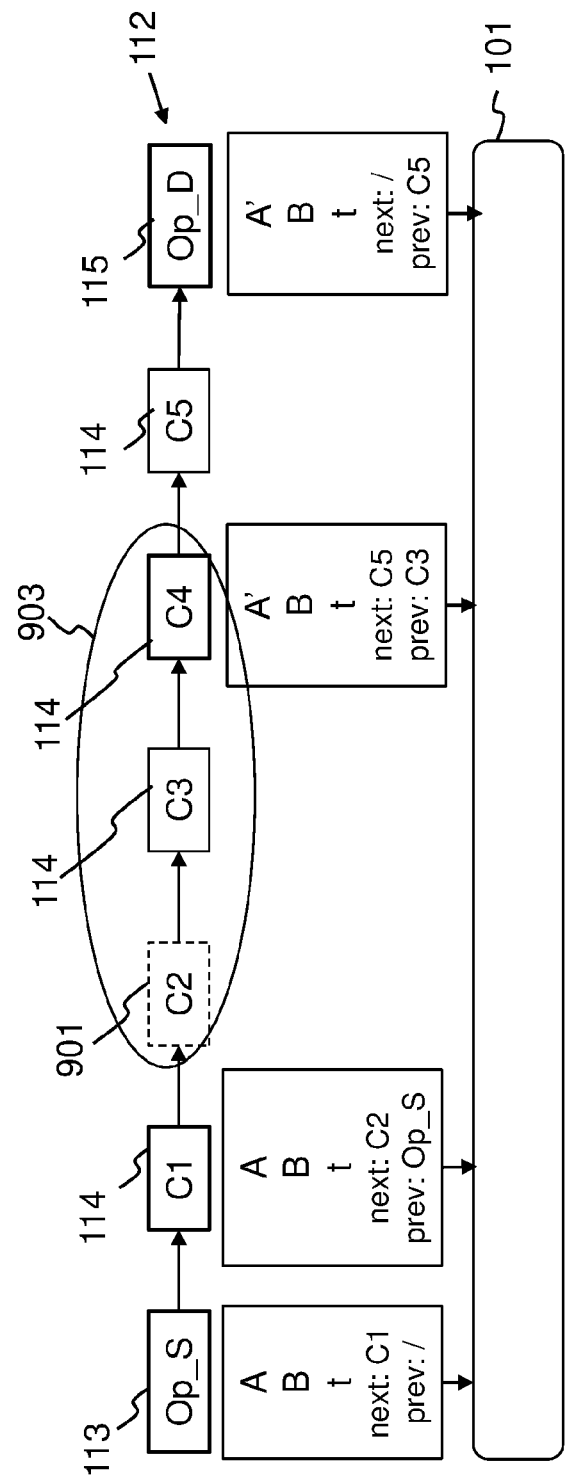

FIGS. 9a and 9b illustrate two different embodiments of how a fraudulent party may be identified by the fraudster identification module. Besides the calling number A, the called number B and the call setup time t, an entry 102 comprises the routing information, indicating who are the next and the previous party handling the call. The routing information allows to reconstruct the call chain 112, i.e. the entries 102 representing the call are arranged in a sequence according to the order in which the operators and carriers have handled the call. In the example of FIG. 9a a fraudulent carrier 900 has hijacked the call. This will be detected by the fraud detection and classification module 103 as the destination operator 115 did not make any entry 102 for this call. The fraudster identification module 104 is configured to identify the party being responsible for the call hijacking fraud. In the example of FIG. 9a this may be done by identifying the last entry was made by carrier 114 C3. The two following carriers 902, i.e. C4 and C5, are therefore suspects of being the fraudulent party. As carrier 114 C5 does not participate in the system, no distinction can be made between carrier 114 C5 and the real fraudulent party 900 C4.

In the example of FIG. 9a a fraudulent carrier 901 has manipulated the CLI, i.e. the calling number was changed from A to A'. This will be detected by the fraud detection and classification module 103 as the correlated entries will comprise different calling numbers. The fraudster identification module 104 is configured to identify the party being responsible for the CLI manipulation. In the example of FIG. 9b this may be done by identifying that the last entry 102 comprising the calling number A was made by carrier 114 C1, and the first entry 102 comprising the calling number A' was made by carrier 114 C4. Therefore, the two intermediate carriers C2 and C3 are identified as suspects for the CLI manipulation. Also the carrier C4 may be considered as belonging to the group of plausible fraudulent parties 903.

Optionally, the system further comprises a notification and reporting module 105, configured to transmit and/or store and/or process one or more results of the fraud detection and classification module 103 and/or the fraudster identification module 104. Different types of outputs 111 may be generated, for example:

Notifications: for any fraud type detected, a notification may be transmitted instantly to all parties involved in the call chain. An interface like e.g. REST API or FTP may be used to share notifications with the relevant parties.

General reporting: an overview may be generated of normal traffic together with statistics on detected fraud types. Also statistics including routing information may be provided. Moreover, platform performance indicators, e.g. number of entries, number of participants, etc. may be added. General reporting may be done e.g. on a daily, weekly or monthly basis.

Lookup of specific entries: for example, only parties that were involved in handling a call may be allowed to lookup entries 102 for that call in the transactions registry 101. The lookup period and quantity may be limited to ensure there is no information exploit for competitive purposes.

In more advanced embodiments, additional logic or modules may be included in the system which make use of data, notifications or reports provided by the notification and reporting module 105, to obtain additional advantages, e.g.:

An operator or carrier may implement logic to detect refiling fraud based on overviews provided by the notification and reporting module 105 of how much traffic was received from various carriers. For example, if a party in country Y agreed with a party in country X upon low termination rates or lower cost for traffic originating from country X and ended in country Y, the party in country Y may detect in this overview reports that an abnormally high amount of traffic reached him from country X. This may imply party X is a fraudulent party being responsible for refiling fraud. This leads to detection of an additional fraud type.

Additional logic may be implemented to put payments on hold when a call was detected as fraudulent and parties are notified upon this detected fraud by the notification and reporting module 105. This leads to a far more efficient and effective system than the currently applied process relying on formal complaints, the need for police reports, and offline CDR sharing to show anomalies.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system for detecting fraud in international telecommunication traffic, comprising:
   a transactions registry accessible by multiple operators and/or carriers;
   a logging module installed with said multiple operators and/or carriers configured to add an entry in said transactions registry by an operator and/or carrier handling a call,
   wherein said entry comprises the calling number, the called number and timing information for said call;
   a fraud detection and classification module configured to:
   select from said transactions registry a group of correlated entries representing said call, by selecting entries added by different operators and/or carriers that all relate to said call;
   compare said correlated entries to detect an anomaly due to said fraud and to classify said call into a fraud type based on said anomaly.

2. The system according to claim 1, wherein said transactions registry is a distributed registry using blockchain technology.

3. The system according to claim 1, wherein said timing information comprises the call setup time of said call.

4. The system according to claim 1, wherein said entry further comprises routing information.

5. The system according to claim 4, wherein said routing information in an entry added by said carrier or operator comprises an identification of the operator or carrier handling said call prior to said carrier or operator, and/or an identification of the operator or carrier handling said call following said carrier or operator.

6. The system according to claim 1, wherein said group of correlated entries is selected based on said timing information and/or said calling number and/or said called number.

7. The system according to claim 4, wherein said group of correlated entries is selected based on said routing information.

8. The system according to claim 1, wherein said system comprises an interface with one or more numbering plan databases and/or one or more mobile number portability databases to determine a source operator from said calling number and/or a destination operator from said called number.

9. The system according to claim 1, wherein said fraud detection and classification module is configured to classify said call into a hijacking type of fraud if an entry of an operator and/or carrier that was expected to handle said call is not present in said group of correlated entries.

10. The system according to claim 1, wherein said operator that was expected to handle said call is the expected destination operator of said call, where said expected destination operator is determined from said called number comprised in said correlated entries via lookup in said one or more numbering plan databases and/or one or more mobile number portability databases.

11. The system according to claim 9, wherein said fraud detection and classification module is configured to further classify said call as hijacking of an artificial call if said called number in said correlated entries is a number not being in use, and otherwise as hijacking of a regular call.

12. The system according to claim 1, wherein said fraud detection and classification module is configured to classify said call into a charge evasion type of fraud if said calling number is not identical in every of said correlated entries representing said call.

13. The system according to claim 12, wherein said fraud detection and classification module is configured to further classify said call as Simbox fraud or bypass fraud,
if an entry of the destination operator of said call comprises a calling number which belongs to the local numbering plan of the country of said destination operator.

14. The system according to claim 12, wherein said fraud detection and classification module is configured to further classify said call as CLI manipulation fraud,
if an entry of the destination operator of said call comprises a calling number which is an international and/or non-existing number.

15. The system according to claim 1, wherein said timing information further comprises the answer time and/or the release time of said call.

16. The system according to claim 15, wherein said fraud detection and classification module is configured to classify said call into a call stretching type of fraud if said answer time is not identical within tolerances in every of said correlated entries representing said call
or if said release time is not identical within tolerances in every of said correlated entries representing said call.

17. The system according to claim 16, wherein said fraud detection and classification module is configured to classify said call into a false answer type of fraud if said answer time is not identical within tolerances in every of said correlated entries representing said call, and to classify a call into a late disconnect type of fraud if said release time is not identical within tolerances in every of said correlated entries representing said call.

18. The system according to claim 1, wherein said system further comprises a fraudster identification module configured to:
arrange said group of correlated entries into a sequence representing the chain of handling said call by said multiple operators and/or carriers;
compare neighboring entries in said sequence to identify one or more plausible fraudsters.

19. The system according to claim 18, wherein said sequence is arranged based on said routing information comprised in said correlated entries.

20. The system according to claim 1, wherein said system further comprises a notification and reporting module, configured to transmit and/or store and/or process one or more results of said fraud detection and classification module and/or said fraudster identification module.

21. A method for detecting fraud in international telecommunication traffic, comprising the steps of:
providing a transactions registry accessible by multiple operators and/or carriers;
adding an entry in said transactions registry by an operator and/or carrier handling a call, wherein said entry comprises the calling number, the called number and timing information for said call;
selecting from said transactions registry a group of correlated entries representing said call, by selecting entries added by different operators and/or carriers that all relate to said call;
comparing said correlated entries to detect an anomaly due to said fraud and to classify said call into a fraud type based on said anomaly.

* * * * *